(12) United States Patent
Kafka et al.

(10) Patent No.: US 6,389,198 B2
(45) Date of Patent: May 14, 2002

(54) PHOTONIC CRYSTAL FIBER SYSTEM FOR SUB-PICOSECOND PULSES

(75) Inventors: James D. Kafka, Mountain View; David E. Spence, Sunnyvale, both of CA (US)

(73) Assignee: Spectra Physics Lasers, Inc., Mountain View, CA (US)

( * ) Notice: Subject to any disclaimer, the term of this patent is extended or adjusted under 35 U.S.C. 154(b) by 0 days.

(21) Appl. No.: 09/854,154

(22) Filed: May 11, 2001

Related U.S. Application Data

(63) Continuation of application No. 09/317,652, filed on May 24, 1999, now Pat. No. 6,236,779.

(51) Int. Cl.$^7$ ................................................. G02B 6/26
(52) U.S. Cl. ....................................................... 385/31
(58) Field of Search ............................... 385/31, 32, 33, 385/34, 39–44, 147; 372/20–23; 359/326–332

(56) References Cited

U.S. PATENT DOCUMENTS

| | | | |
|---|---|---|---|
| 5,365,366 A | 11/1994 | Kafka et al. | 359/330 |
| 5,847,861 A | 12/1998 | Kafka et al. | 359/330 |
| 6,075,915 A | 6/2000 | Koops et al. | 385/125 |
| 6,097,870 A | 8/2000 | Ranka et al. | 385/127 |
| 6,236,779 B1 * | 5/2001 | Kafka et al. | 385/31 |

FOREIGN PATENT DOCUMENTS

| | | | |
|---|---|---|---|
| WO | WO 99/00685 | 1/1999 | G02B/6/16 |

OTHER PUBLICATIONS

Ranka, J. et al., "Efficient Visible continuum generation in air–silica microstructure optical fibers with anomalous dispersion at 800nm" Bell Labs/Lucent Tech. (Murray Hill, ND, pp. 1–2 (May 25, 1999).

Mogilevtsev, T.A. et al., "Group–velocity dispersion in photonic crystal fibers", Optcs Letters, Optical Soc. Of america, vol. 23, No. 21, pp. 1662–1664 (Nov. 1, 1998).

Knight, J.C. et al., "All–Silica Single–mode optical fiber with photonic crystal fibers", Optics Letters, Optical Soc. Of America, vol. 21, No. 19, pp. 1547–1549 (Oct. 1, 1996).

Birks, T.A. et al., "Single–mode photonic crystal fiber with an indefintely large core", CLEO 98, pp. 226–227 (May 6, 1998).

Birks, T.A. et al., "Endlessly single–mode photonic crystal fiber" Optical Soc. Of America, vol. 22, No. 13. pp. 961–963 (Jul. 1, 1997).

Wadsworth, W. et al., "Soliton effects in Photonic crystal fibres at 850nm", Electronics Letters, vol. 36, No. 1, Jan. 6, 2000, pp. 53–55.

Gander, M. et al., "Experimental measurement of group velocity dispersion in photonic crystal fibre", Electronics Letters, vol. 35, No. 1, Jan. 7, 1999, pp. 63–64.

Monro, T.M. et al., "Efficient Modelling of holey fibers", Optical Fiber Conference, vol. 4, Feb. 1999, vol. 4, pp. 111–113.

Ferrando, A. et al., "Designing a photonic crystal fibre with flattened chromatic dispersion", Electronics Letters, vol. 35, No. 4, Feb. 18, 1999, pp. 325–327.

Beaud, P. et al., Ultrashort pulse propagation, pulse breakup and fundamental soliton formation in a single–mode optical fiber, IEEE Journal, vol. QE–23, No. 11, Nov. 1987, pp. 1938–1946.

* cited by examiner

*Primary Examiner*—Akm E. Ullah
(74) *Attorney, Agent, or Firm*—Wilson Sonsini Goodrich & Rosati

(57) ABSTRACT

Fiber delivery systems are desirable to provide convenient delivery of an output beam from a laser system to a target distanced from the source. For ultra-short pulse lasers, a limiting factor in fiber delivery is the dispersion of the optical fiber. A fiber delivery system for ultra-short pulses that uses a photonic crystal fiber to Fprovide the appropriate dispersion is described.

23 Claims, 1 Drawing Sheet

PHOTONIC CRYSTAL FIBER SYSTEM FOR SUB-PICOSECOND PULSES

CROSS-REFERENCE TO RELATED APPLICATIONS

This application is a continuation of U.S. Ser. No. 09/317,652, filed Mar. 24, 1999 now U.S. Pat. No. 6,236,779, which application is fully incorporated herein by reference.

BACKGROUND OF THE INVENTION

1. Field of the Invention

This invention relates generally to fiber delivery of ultra-short pulses, and more particularly to the use of photonic crystal fibers in an ultra-short pulse delivery system.

2. Description of Related Art

Fiber delivery systems are desirable for laser systems to provide convenient delivery of an output beam to a target distanced from the source. In particular, for ultra-short pulse lasers, a limiting factor in fiber delivery is the dispersion of the optical fiber.

At wavelengths of less than 1.27 microns, all step-index fibers have normal dispersion. In this regime, the ultra-short pulses broaden substantially while propagating in a fiber of lengths as short as a few meters. Prism or grating pairs, which provide anomalous dispersion, have been used to compensate the dispersion of the fiber. However, this increases complexity and cost and in the case of grating pairs, is inefficient. Additionally, with a tunable laser, the prism or grating pair requires adjustment as the wavelength is tuned.

There have been suggestions to use photonic crystal fibers to shift the zero dispersion wavelength to shorter values. In "Group-velocity dispersion in photonic crystal fibers", by D. Mogilevtsev, T. A. Birks and P. St. J. Russell, in Optics Letters 23, 1662 (1998) it is suggested that this may be useful in telecommunication systems. In "Efficient visible continuum generation in air-silica microstructure optical fibers with anomalous dispersion at 800 nm", by J. K. Ranka, R. S. Windeler and A. J. Stentz, Postdeadline paper at CLEO 1999 (Optical Society of America), it is shown that in combination with a Ti:sapphire laser, novel non-linear effects are possible.

There is a need for a fiber delivery system for delivering ultra-short laser pulses. As a result, there is a need for a fiber that has an appropriate value of dispersion at wavelengths where common ultra-short pulse lasers operate.

SUMMARY OF THE INVENTION

Accordingly, an object of the present invention is to provide a fiber delivery system for delivering ultra-short pulses.

Another object of the present invention is to provide a fiber delivery system with a fiber that has an appropriate value of dispersion at wavelengths where common ultra-short lasers operate.

These and other objects of the invention are achieved in a system that delivers sub-picosecond pulses. Included is a source that produces an output beam of sub-picosecond pulses at a wavelength no greater than 1.27 microns. A photonic crystal fiber is coupled to the source to receive the output beam.

DETAILED DESCRIPTION

Figure 1:
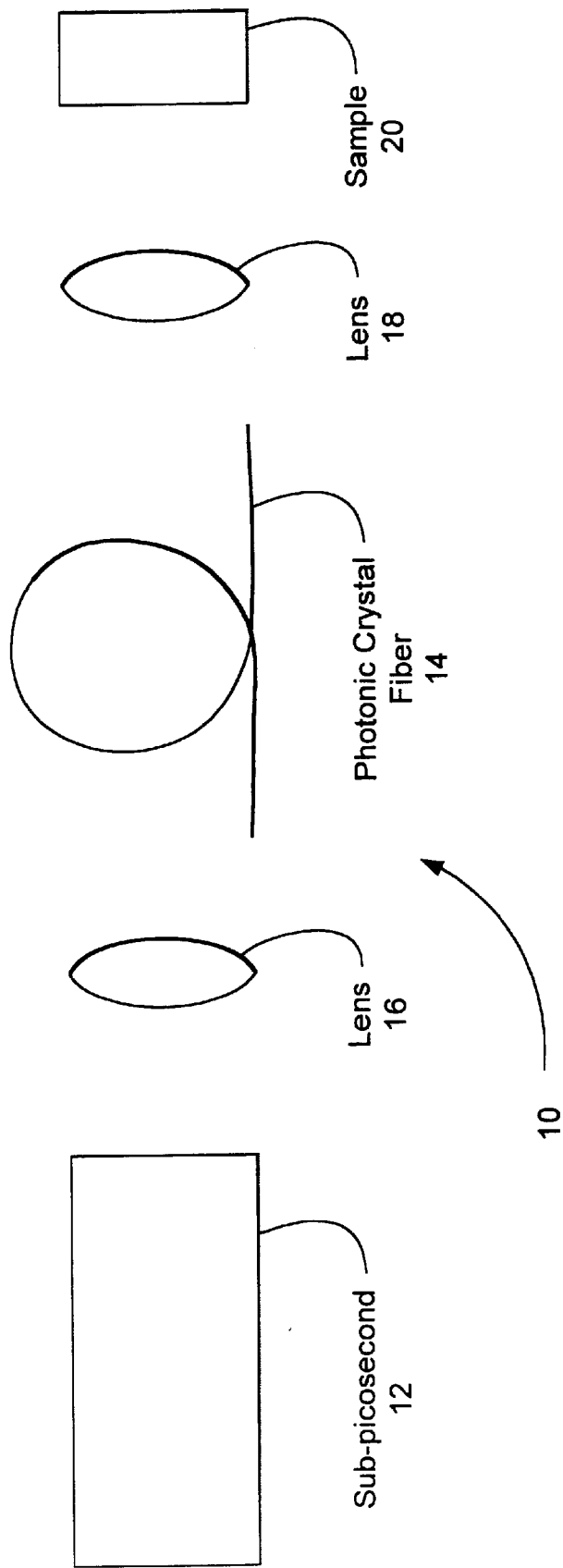
FIG. 1 is a schematic diagram of one embodiment of the present invention illustrating a laser and a photonic crystal fiber.

The present invention can utilize several sources of ultra-short pulses in the wavelength range between 700 and 1270 nm. The most popular is the Ti:sapphire laser, however other sources include optical parametric oscillators and the Cr doped colquiriites such as LiSAF, LiCAF, LiSCAF and LiSGAF. Also included are longer wavelength ultra-short pulse sources, which are then frequency doubled. Examples include frequency doubled Erbium doped fiber lasers, frequency doubled optical parametric oscillators and frequency doubled Forsterite lasers. Finally, there are sources of sub-picosecond pulses at wavelengths between 1000 and 1100 nm such as Nd or Yb doped glass.

Additionally, to deliver low power sub-picosecond pulses without substantial pulse broadening, the present invention utilizes a photonic crystal fiber designed to have nearly zero dispersion at the wavelength that the laser operates. For example, a Ti:sapphire laser operating at a wavelength of 800 nm with transform limited pulses with duration of 100 fs, will have a bandwidth of 7 nm. Typical step-index fibers have a normal dispersion D of −120 ps/nm-km at 800 nm. The pulse will broaden by an amount D times the bandwidth, or 840 fs, for each meter of fiber it passes through. To prevent significant broadening the dispersion of the fiber should be kept between −20 and +20 ps/nm-km. Clearly the lower the absolute value of the dispersion, the longer the fiber that can be used without broadening the pulse.

As the power of the pulse is increased, nonlinear effects will become important. Nonlinear effects, such as self phase modulation (SPM), Raman generation or continuum generation will broaden the bandwidth of the pulse. This distortion of the pulse is clearly undesirable for a sub-picosecond pulse delivery system. A small amount of SPM can be compensated, however, by choosing a fiber with a small amount of anomalous dispersion. When the correct balance is chosen, the pulse becomes a soliton and can propagate long distances in the fiber without changing pulse duration. This is clearly a desirable situation for a sub-picosecond pulse delivery system. To obtain a soliton with a given pulse duration and energy, the dispersion and the core size of the fiber must be chosen appropriately. Consider the Ti:sapphire laser operating at a wavelength of 800 nm with transform limited pulses with duration of 100 fs. For a photonic crystal fiber with a dispersion D of +100 ps/nm-km and a core size of 10 microns, the N=1 soliton will have a peak power of 13 kW. At a repetition rate of 80 MHz this corresponds to 100 mW of average power.

Referring now to FIG. 1, one embodiment of the present invention is a system 10 that delivers sub-picosecond pulses. System 10 includes a source 12 of sub-picosecond pulses as described above and a photonic crystal fiber 14 coupled to source 12. Suitable sources 12 include but are not limited to a mode-locked Ti:sapphire laser, a synchronously pumped OPO, a mode-locked Cr-doped colquiriite laser, a mode-locked fiber laser, a mode-locked Forsterite laser, a mode-locked Nd-doped glass laser, a mode-locked Yb-doped glass laser and the like. A first optical device 16 is positioned between source 12 and fiber 14. First optical element 16 couples an output beam from source 12 into an input end of fiber 14. Suitable first optical elements 16 include but are not limited to a lens, a waveplate, an attenuator, a filter, a polarizer and combinations thereof.

A second optical device 18 is positioned at an output end of fiber 14 to reduce the divergence of the output beam from 14 fiber and deliver the output beam to a selected target 20. Suitable second optical elements 18 include but are not limited to a lens, a waveplate, an attenuator, a filter, a polarizer, an acousto-optic modulator, an electro-optic modulator, a scanner, a microscope and combinations thereof.

Photonic crystal fibers typically preserve the polarization of a linearly polarized input beam that is oriented correctly with respect to fiber 14. To orient the polarization, a half waveplate can be used. Further, an attenuator, which may consist of a polarizer and waveplate, can be used to adjust the power delivered to fiber 14. The output of photonic crystal fiber 14 may be directed to an attenuator, or an acousto-optic or electro-optic modulator to modulate the intensity of the output beam. A scanning system may be used to deflect the direction of the beam. Further, the output of fiber 14 may be directed to an optical instrument including a microscope.

In a second embodiment, fiber 14 is a large core photonic crystal fiber. Typical fibers have core sizes of 1–2 microns in radius. As the power of the ultra-short pulses in fiber 14 is increased, nonlinear effects begin to broaden the bandwidth and distort the pulse. A fiber 14 with a larger core size can deliver higher peak power pulses without pulse distortion. For a given length of fiber 14 with twice the core size, four times the power can be delivered with a comparable amount of pulse distortion. A practical upper limit is placed on the core size, since the bending losses also increase with larger core size.

In a third embodiment, fiber 14 consists of a dispersion flattened photonic crystal fiber. In a typical fiber, the dispersion will remain between −20 and +20 ps/nm-km for less than 100 nm. In dispersion flattened fiber 14, the dispersion remains small over a larger range of wavelengths. When used in conjunction with a tunable source of sub-picosecond pulses, such as a Ti:sapphire laser, fiber 14 allows the delivery of sub-picosecond pulses over a large range of wavelengths.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A system that delivers sub-picosecond pulses, comprising:
    a source that produces an output beam of sub-picosecond pulses at a wavelength no greater than 1.27 microns; and
    a hollow core photonic crystal fiber coupled to the source to receive the output beam.

2. A system that delivers sub-picosecond pulses, comprising:
    a source that produces an output beam;
    a hollow core photonic crystal fiber coupled to the source to receive the output beam, the hollow core photonic crystal fiber delivering pulses at the target with a pulsewidth less than 2 times a pulsewidth of the source;
    a first optical device positioned between the source and the hollow core fiber, the first optical element coupling the output beam into an input end of the hollow core fiber; and
    a second optical device positioned at an output end of the hollow core fiber that delivers the output beam to a selected target.

3. The system of claim 2, wherein the first optical device is selected from a lens, a waveplate, an attenuator, a filter, a polarizer and combinations thereof.

4. The system of claim 2, wherein the second optical element is selected from a lens, a waveplate, an attenuator, a filter, a polarizer, an acousto-optic modulator, an electro-optic modulator, a scanner, a microscope and combinations thereof.

5. The system of claim 2, wherein the source is a mode-locked Ti:sapphire laser.

6. The system of claim 2, wherein the source is a synchronously pumped OPO.

7. The system of claim 2, wherein the source is a mode-locked Cr-doped colquiriite laser.

8. The system of claim 2, wherein the source is a mode-locked fiber laser.

9. The system of claim 2, wherein the source is a mode-locked Forsterite laser.

10. The system of claim 2, wherein the source is a mode-locked Nd-doped glass laser.

11. The system of claim 2, wherein the source is a mode-locked Yb-doped glass laser.

12. The system of claim 2, wherein the hollow core photonic crystal fiber provides delivery of pulses at the target that have a bandwidth less than 2 times the bandwidth of the source.

13. A system that delivers sub-picosecond pulses, comprising:
    a source that produces an output beam of sub-picosecond pulses;
    a hollow core photonic crystal fiber coupled to the source to receive the output beam having a value of dispersion between −20 and +20 ps/nm-km at the wavelength of source;
    a first optical device positioned between the source and the fiber, the first optical element coupling the output beam into an input end of the fiber; and
    a second optical device positioned at an output end of the fiber that delivers the output beam to a selected target.

14. The system of claim 13, wherein the source is a mode-locked Ti:sapphire laser.

15. The system of claim 13, wherein the source is a synchronously pumped OPO.

16. The system of claim 13, wherein the source is a mode-locked Cr-doped colquiriite laser.

17. The system of claim 13, wherein the source is a mode-locked fiber laser.

18. The system of claim 13, wherein the source is a mode-locked Forsterite laser.

19. The system of claim 13, wherein the source is a mode-locked Nd-doped glass laser.

20. The system of claim 13, wherein the source is a mode-locked Yb-doped glass laser.

21. The system of claim 13, wherein the hollow core photonic crystal fiber provides delivery of pulses at the target that have a bandwidth less than 2 times the bandwidth of the source.

22. The system of claim 13, wherein the hollow core photonic crystal fiber is a large core hollow core photonic crystal fiber.

23. The system of claim 13, wherein the hollow core photonic crystal fiber is a dispersion flattened hollow core photonic crystal fiber.

* * * * *